United States Patent
Paul et al.

(10) Patent No.: US 9,415,871 B1
(45) Date of Patent: Aug. 16, 2016

(54) AIRCRAFT ADAPTED FOR TRANSPORTING CARGO

(71) Applicant: SQUARE PEG ROUND HOLE LLC, Boise, ID (US)

(72) Inventors: John-Curtiss Paul, Boise, ID (US); James D. Raeder, Caldwell, ID (US)

(73) Assignee: SQUARE PEG ROUND HOLE LLC, Boise, ID (US)

( * ) Notice: Subject to any disclaimer, the term of this patent is extended or adjusted under 35 U.S.C. 154(b) by 0 days.

(21) Appl. No.: 14/629,162

(22) Filed: Feb. 23, 2015

(51) Int. Cl.
- *B64C 1/22* (2006.01)
- *B64D 9/00* (2006.01)
- *B64C 1/14* (2006.01)
- *B64D 11/06* (2006.01)

(52) U.S. Cl.
CPC .............. *B64D 9/00* (2013.01); *B64C 1/1415* (2013.01); *B64C 1/1461* (2013.01); *B64D 11/06* (2013.01); *B64D 11/0689* (2013.01)

(58) Field of Classification Search
None
See application file for complete search history.

(56) References Cited

U.S. PATENT DOCUMENTS

| | | | | |
|---|---|---|---|---|
| 1,441,984 A * | 1/1923 | Jacobs | B64C 1/08 244/119 |
| 1,588,268 A * | 6/1926 | Roche | B64C 1/08 29/897.2 |
| 1,751,957 A * | 3/1930 | Towle | B64C 3/00 244/123.12 |
| 1,852,208 A * | 4/1932 | Huggins | B64C 1/08 244/117 R |
| 1,880,481 A * | 10/1932 | Ragsdale | B64C 1/08 244/119 |
| 1,881,296 A * | 10/1932 | Potez | B64C 1/061 244/119 |
| 2,149,476 A * | 3/1939 | Tetzlaff | A63H 33/101 446/124 |
| 2,149,844 A * | 3/1939 | George | B64C 1/08 228/178 |
| 2,203,174 A * | 6/1940 | Muttray | B60J 10/02 52/171.2 |
| 2,327,636 A * | 8/1943 | Gerber | B64C 1/1484 244/120 |
| 2,367,750 A * | 1/1945 | Berkow | B64C 3/00 114/78 |
| 2,709,318 A * | 5/1955 | Benjamin | A63H 33/10 16/38 |
| 2,818,226 A * | 12/1957 | Hiller, Jr. | B64C 27/04 244/119 |
| 2,976,968 A * | 3/1961 | Fentiman | E04B 1/19 403/173 |
| 3,048,109 A * | 8/1962 | Feemster | F42B 10/06 244/123.1 |
| 3,445,129 A * | 5/1969 | Penote | E04G 7/02 182/185.1 |
| 3,632,147 A * | 1/1972 | Finger | A47F 5/14 403/171 |
| 4,259,821 A * | 4/1981 | Bush | B64G 9/00 244/159.4 |
| 4,479,662 A * | 10/1984 | Defour | B62K 19/22 280/281.1 |
| 4,624,425 A * | 11/1986 | Austin | B64C 1/061 244/118.1 |
| 4,624,599 A * | 11/1986 | Piasecki | B64C 1/06 244/131 |
| 4,627,149 A * | 12/1986 | Colas | B21D 39/06 182/228.4 |
| 4,728,113 A * | 3/1988 | Thun, Jr. | B62K 19/06 228/173.4 |
| 4,776,721 A * | 10/1988 | Lange | E04B 1/1903 403/13 |
| 4,822,199 A * | 4/1989 | Nehls | E04B 1/1906 403/171 |
| 4,930,930 A * | 6/1990 | Coppa | E04B 1/1909 403/170 |
| 5,090,639 A | 2/1992 | Miller et al. | |
| 5,169,258 A * | 12/1992 | Raynak | E04B 1/585 403/170 |
| 5,399,043 A * | 3/1995 | Plumeyer | E04B 1/1906 403/171 |
| 5,518,208 A * | 5/1996 | Roseburg | B64C 1/064 244/119 |
| 5,549,408 A * | 8/1996 | Lo | A47B 47/0016 403/171 |

(Continued)

*Primary Examiner* — Medhat Badawi
(74) *Attorney, Agent, or Firm* — Law Offices of Michael L. Wise, LLC

(57) ABSTRACT

The fuselage of an aircraft comprises a floor structure, a roof structure, a first lateral side structure, a second lateral side structure, and a middle structure. The floor structure, the roof structure, the first lateral side structure, and the second lateral side structure define a fuselage space between them. The middle structure spans at least part way between the floor structure and the roof structure, and runs between the first lateral side structure and the second lateral side structure such that the middle structure partitions the fuselage space into an occupant space and a cargo space. A seat for a pilot is disposed in the occupant space lateral to a portion of the middle structure and a portion of the cargo space.

19 Claims, 14 Drawing Sheets

(56) References Cited

U.S. PATENT DOCUMENTS

| | | | | |
|---|---|---|---|---|
| 6,032,430 A * | 3/2000 | Soukup | ............... | E04B 1/585 403/170 |
| 6,126,113 A * | 10/2000 | Navickas | ............... | B64C 1/06 244/120 |
| 6,883,748 B2 * | 4/2005 | Yoeli | ............... | B60V 1/06 244/118.1 |
| 6,993,879 B1 * | 2/2006 | Cantley | ............... | E04C 3/28 446/124 |
| 8,177,166 B2 * | 5/2012 | Haack | ............... | B64C 1/061 244/119 |
| 8,205,824 B2 * | 6/2012 | Goos | ............... | B64C 1/061 244/119 |
| 8,342,037 B2 * | 1/2013 | Lafont | ............... | G01L 5/133 73/760 |
| 8,397,463 B2 * | 3/2013 | Allred, III | ............... | E04C 3/08 403/170 |
| 8,528,291 B2 * | 9/2013 | Allred, III | ............... | F16B 7/0426 135/909 |
| 8,763,951 B2 | 7/2014 | Smith, Jr. | | |
| 2002/0179772 A1 * | 12/2002 | Ohmer | ............... | B64C 1/061 244/119 |
| 2004/0155143 A1 * | 8/2004 | Yoeli | ............... | B60V 1/06 244/17.11 |
| 2005/0242231 A1 * | 11/2005 | Yoeli | ............... | B60V 1/06 244/23 R |

\* cited by examiner

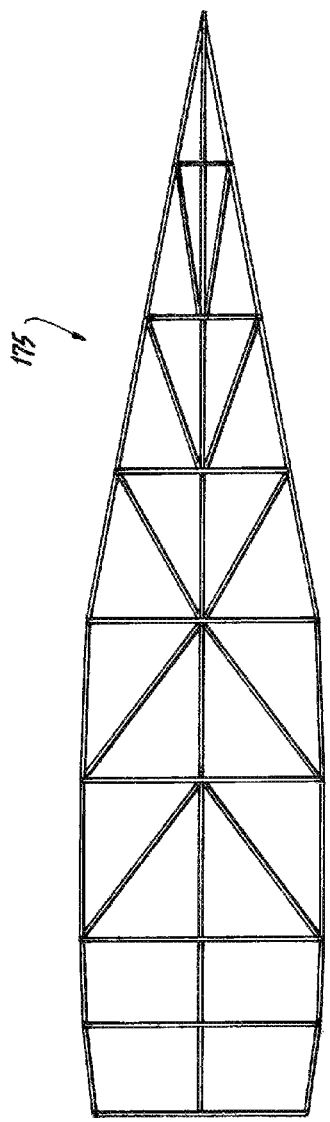
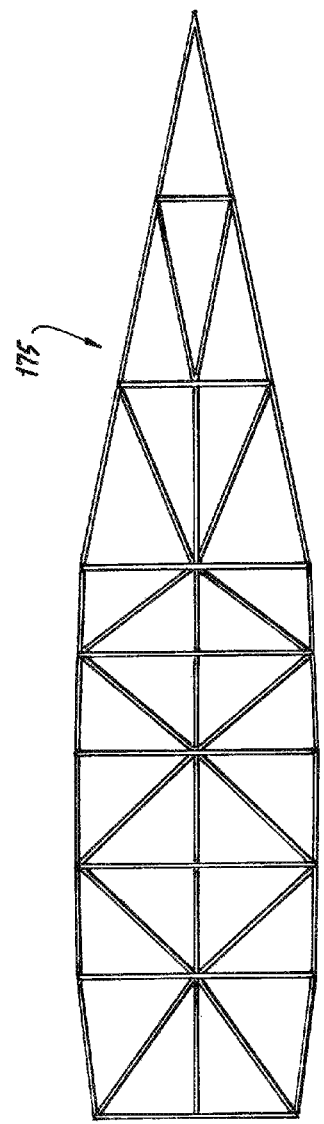
*Fig. 7*
*Fig. 8*

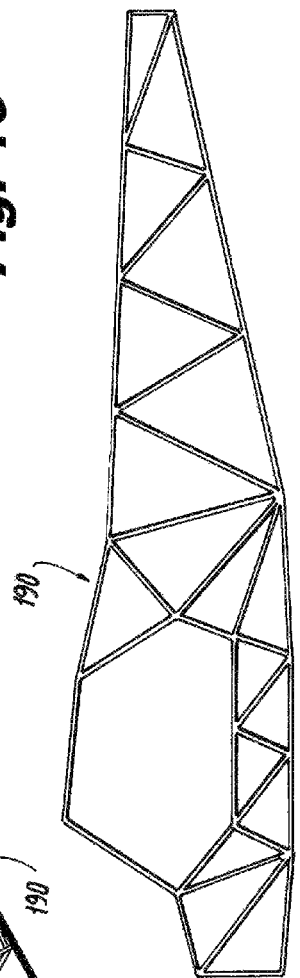
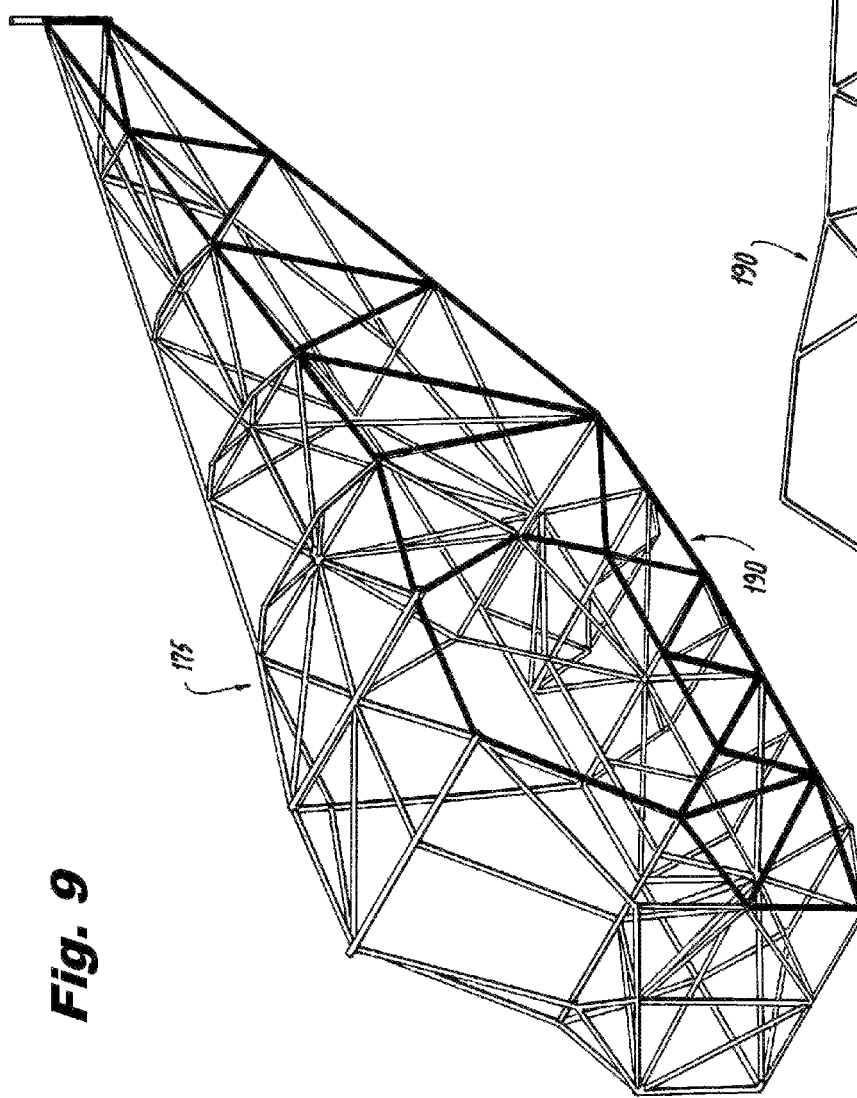
Fig. 10
Fig. 9

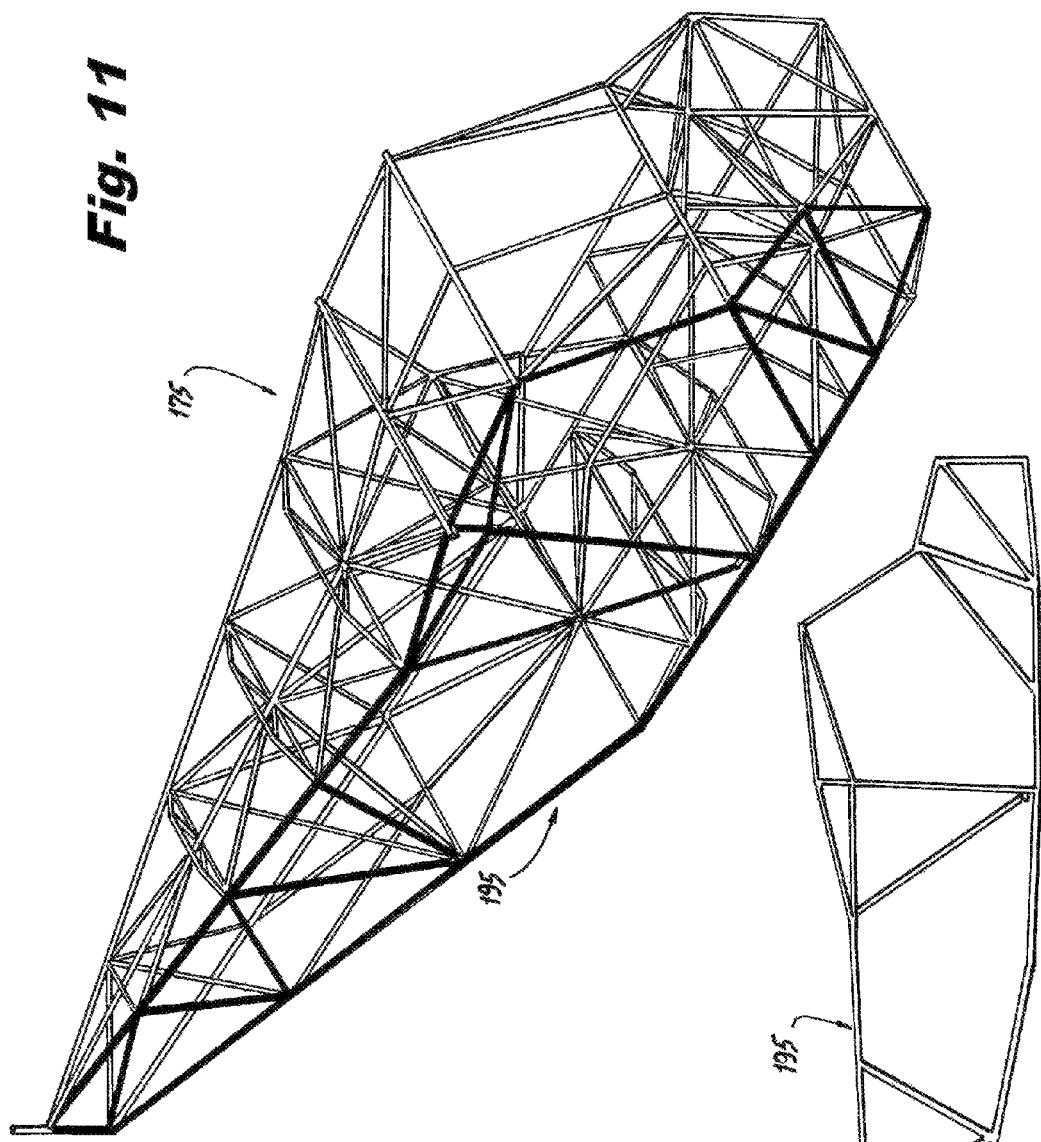
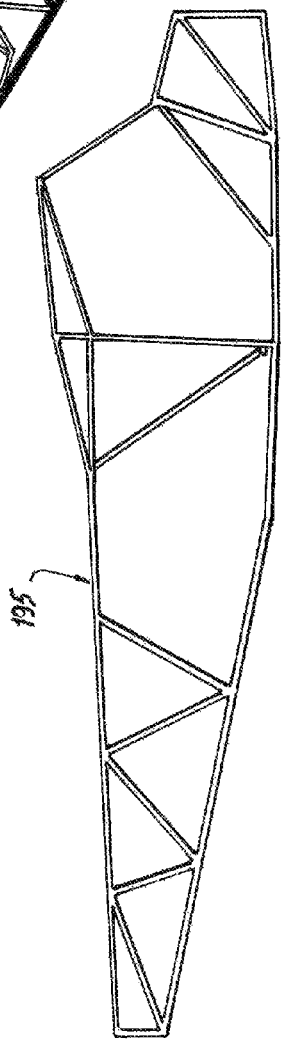

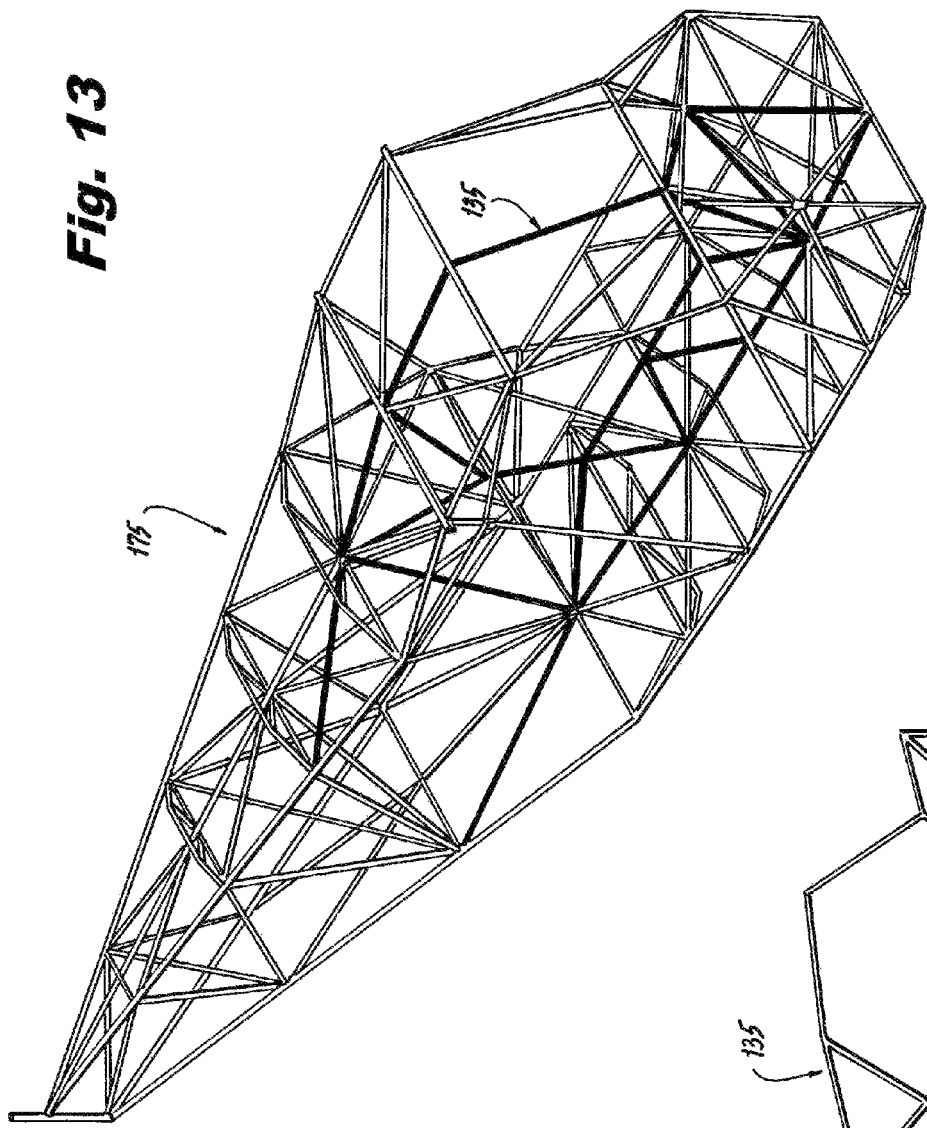
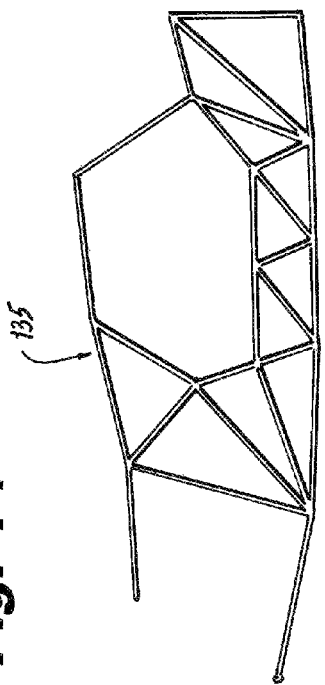

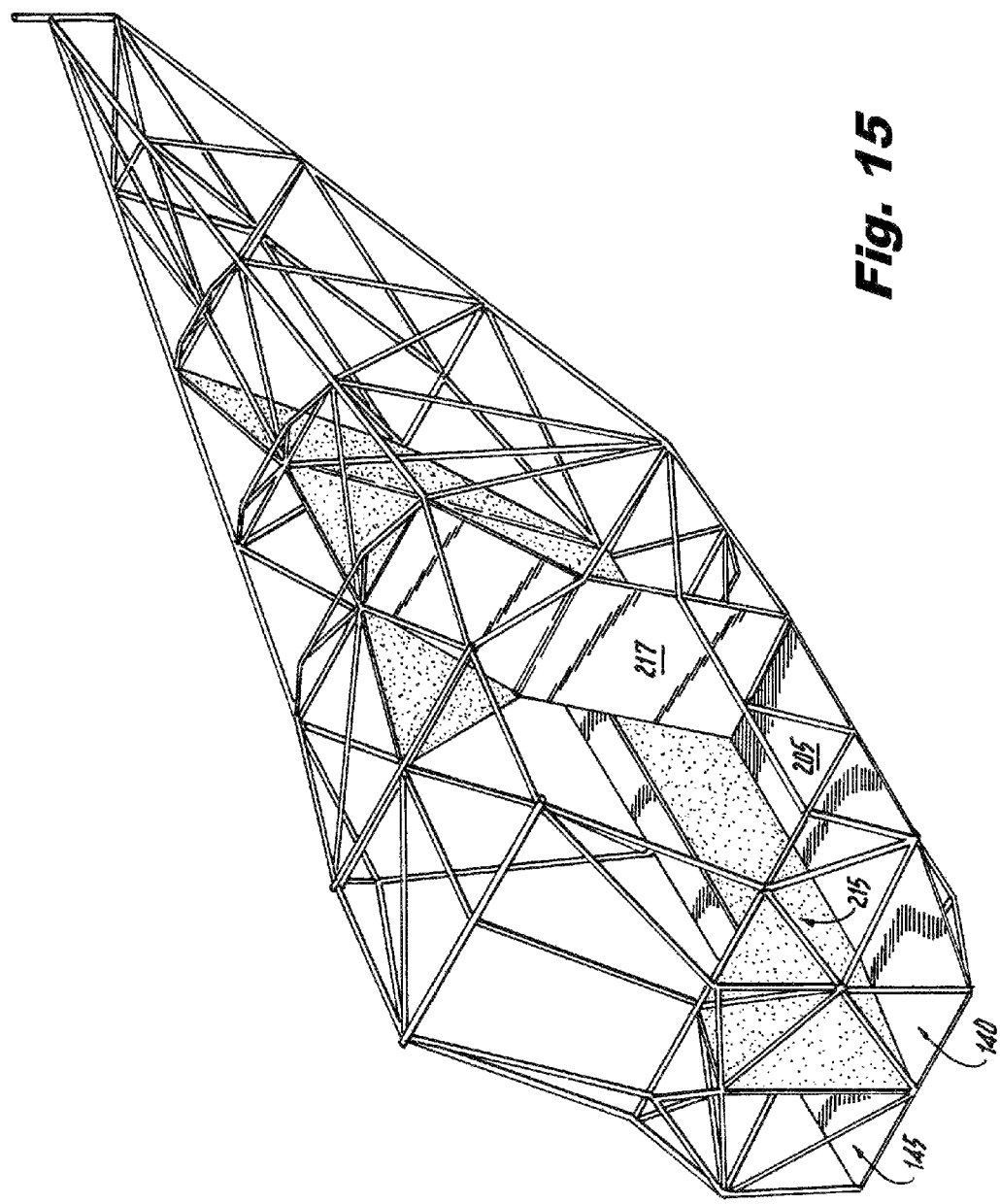

AIRCRAFT ADAPTED FOR TRANSPORTING CARGO

FIELD OF THE INVENTION

The present invention relates generally to aircraft, and, more particularly, to aircraft specially adapted to carry cargo.

BACKGROUND OF THE INVENTION

The majority of light aircraft are configured with relatively small cargo compartments located aft of the seating for the occupants. As a result, these aircraft are not well suited for carrying relatively large, elongate items such as bicycles, motorcycles, snowmobiles, jet skis, and small boats. An issue frequently faced by pilots of these aircraft is therefore what to do about transportation and recreation after reaching a destination airport. Such an issue is of particular significance when accessing rugged backcountry airstrips where there may be little or no infrastructure. While the aircraft and pilot are capable of reaching these locations, there may be little to do when getting there other than, perhaps, camping and hiking with relatively little gear and supplies.

There have been several attempts to address this issue. Solutions have included, for example, creating hybrid vehicles that are capable of acting as both an aircraft and as an automobile. A modern example is the "Transition" created by TERRAFUGIA® (Woburn, Mass., USA). Nevertheless, these hybrid vehicles have not achieved significant adoption despite substantial efforts by their designers. In many cases, the compromises required to combine an aircraft and an automobile into a single vehicle result in a vehicle which is not particularly good at either function. These hybrid vehicles, moreover, are not typically well suited to off-road use.

Other solutions have focused on reducing the size of the cargo, namely, by providing folding land and water vehicles such as folding bicycles and canoes. Here again, however, the folding vehicles tend to be compromised in terms of strength and performance, and the solution does not lend itself easily to motorized land and water vehicles. At the same time, even when folded, these bicycles and canoes are often still too large to easily fit in a small aircraft. Moreover, even when such folding vehicles can be loaded in a light aircraft, they frequently reduce the ability of that aircraft to carry passengers.

For the foregoing reasons, there is a need for light aircraft designs that are readily capable of carrying relatively large cargo with elongate shapes such as bicycles, motorcycles, snowmobiles, jet skis, and small boats.

SUMMARY OF THE INVENTION

Embodiments of the present invention address the above-identified needs by providing aircraft designs with unique cargo carrying capabilities.

Aspects of the invention are directed to an aircraft with a fuselage. The fuselage comprises a floor structure, a roof structure, a first lateral side structure, a second lateral side structure, and a middle structure. The floor structure, the roof structure, the first lateral side structure, and the second lateral side structure define a fuselage space between them. The middle structure spans at least part way between the floor structure and the roof structure, and runs between the first lateral side structure and the second lateral side structure such that the middle structure partitions the fuselage space into an occupant space and a cargo space. The occupant space is disposed between the first lateral side structure and the middle structure, while the cargo space is disposed between the second lateral side structure and the middle structure. A seat for a pilot is disposed in the occupant space lateral to a portion of the middle structure and a portion of the cargo space.

Advantageously, aspects of the invention may be retrofittable or modifiable to existing aircraft so as to provide those aircraft with the capability to carry relatively large, elongate cargo. Weight of the cargo may be distributed close to and along the centerline of the aircraft so as to not adversely affect lateral/longitudinal center-of-gravity and controllability.

BRIEF DESCRIPTION OF THE DRAWINGS

These and other features, aspects, and advantages of the present invention will become better understood with regard to the following description, appended claims, and accompanying drawings where:

FIG. 7 shows a top elevational view of the joined tubing forming the fuselage of the FIG. 1 aircraft;

FIG. 8 shows a bottom elevational view of the joined tubing forming the fuselage of the FIG. 1 aircraft;

FIG. 9 shows a right perspective view of the joined tubing forming the fuselage of the FIG. 1 aircraft with the first lateral side structure highlighted;

FIG. 10 shows a right elevational view of the first lateral side structure of the FIG. 1 aircraft;

FIG. 11 shows a left perspective view of the joined tubing forming the fuselage of the FIG. 1 aircraft with the second lateral side structure highlighted;

FIG. 12 shows a left elevational view of the second lateral side structure of the FIG. 1 aircraft;

FIG. 13 shows a left perspective view of the joined tubing forming the fuselage of the FIG. 1 aircraft with the middle structure highlighted;

FIG. 14 shows a left elevational view of the middle structure of the FIG. 1 aircraft;

FIG. 15 shows a right perspective view of floors and coverings in the FIG. 1 aircraft;

DETAILED DESCRIPTION OF THE INVENTION

Figure 1:
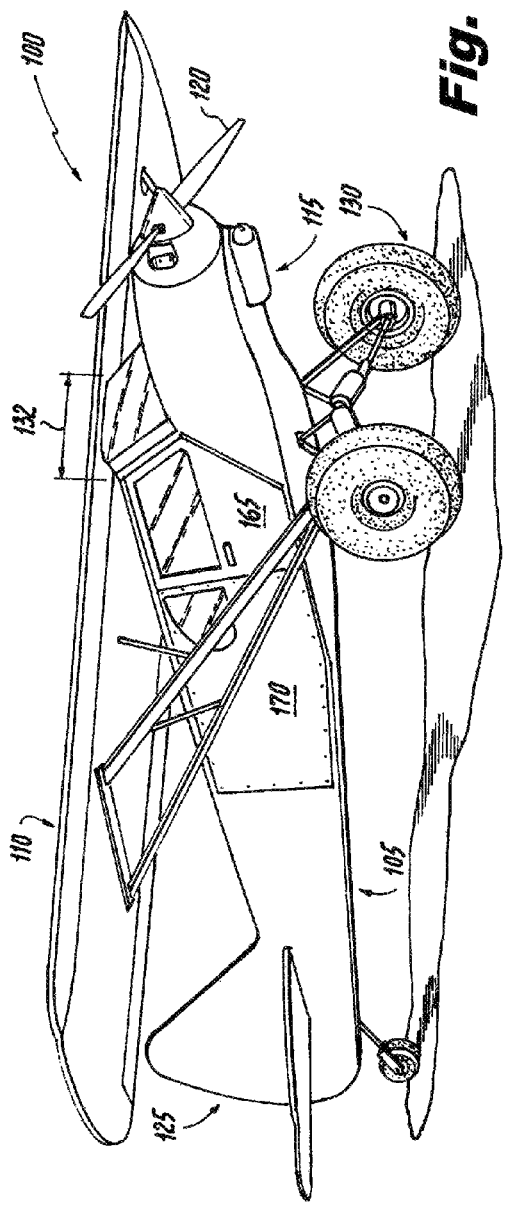
FIG. 1 shows a left perspective view of an aircraft in accordance with a first illustrative embodiment of the invention.

The present invention will be described with reference to illustrative embodiments. For this reason, numerous modifications can be made to these embodiments and the results will still come within the scope of the invention. No limitations with respect to the specific embodiments described herein are intended or should be inferred.

Moreover, while an aircraft has a myriad of components and systems, only those elements important to setting forth aspects of the invention are described with any particularity herein. Nevertheless, one having ordinary skill in the relevant arts will recognize the additional elements needed to make a viable aircraft. Reference is also made to the following references, which are published by the Federal Aviation Administration of the U.S. Department of Transportation:
Pilot's Handbook of Aeronautical Knowledge (2008);
Aviation Maintenance Technician Handbook (2008);
Aviation Maintenance Technician Handbook—Airframe, Volumes 1 and 2 (2012); and
Aviation Maintenance Technician Handbook—Powerplant, Volumes 1 and 2 (2012).
Reference is further made to: D. J. Perry, *Aircraft Structures*, Courier Corporation, 2013; and I. Moir et al., *Aircraft Systems: Mechanical, Electrical, and Avionics Subsystems Integration, Third Edition*, Wiley, 2008. All of these references are hereby incorporated by reference herein.

Certain terms and phrases have particular meanings in the present description and the appended claims. The term "aircraft" means any kind of machine capable of flying by gaining support from the air. The term therefore encompasses, but is not limited to, fixed wing aircraft and rotorcraft. The term "fuselage" means the main body of an aircraft. A fuselage may therefore contain spaces for occupants and cargo, flight instruments and controls, and attachment points to other major aircraft components (e.g., wings, tail, engine, landing gear). A first structure is "removably attached" to a second structure if the first structure may be detached from, and reattached to, the second structure without permanent alteration of any elements by destructive acts such as cutting, grinding, or breaking Lastly, a "structural member" of an aircraft is a structure that provides strength and support to that aircraft. A structural member resists at least one of tension, compression, bending, shear, and torsion acting on the aircraft. In an aircraft, a structural member may include, as just some examples, longerons, tubes, struts, braces, stringers, ribs, bulkheads, frames, formers, skins, and the like.

The aircraft designs set forth herein will be described with reference to directional terms such as "longitudinal," "lateral," "vertical," "forward," "aft," "left," and "right." These directions are referenced to an aircraft oriented as if it were in level flight from the vantage point of a pilot sitting in a pilot's seat. The forward direction is towards the nose of the aircraft, while the aft direction is towards the tail of the aircraft. The longitudinal direction runs from nose to tail, and the lateral direction runs from side to side (e.g., from wingtip to wingtip in a fixed wing aircraft). The vertical direction runs vertically through the aircraft perpendicular to the longitudinal and lateral directions.

Figure 2:
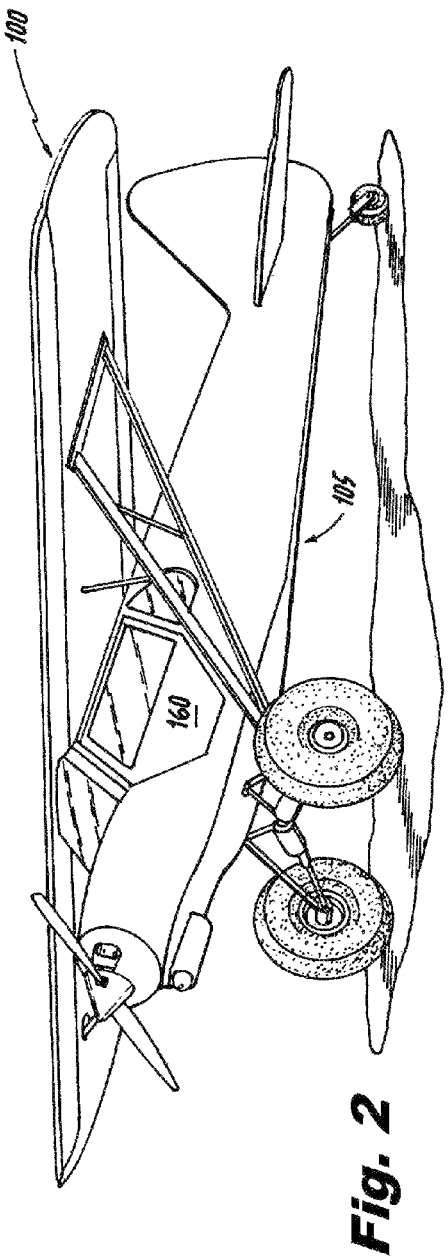
FIG. 2 shows a right perspective view of the FIG. 1 aircraft.
Figure 3:
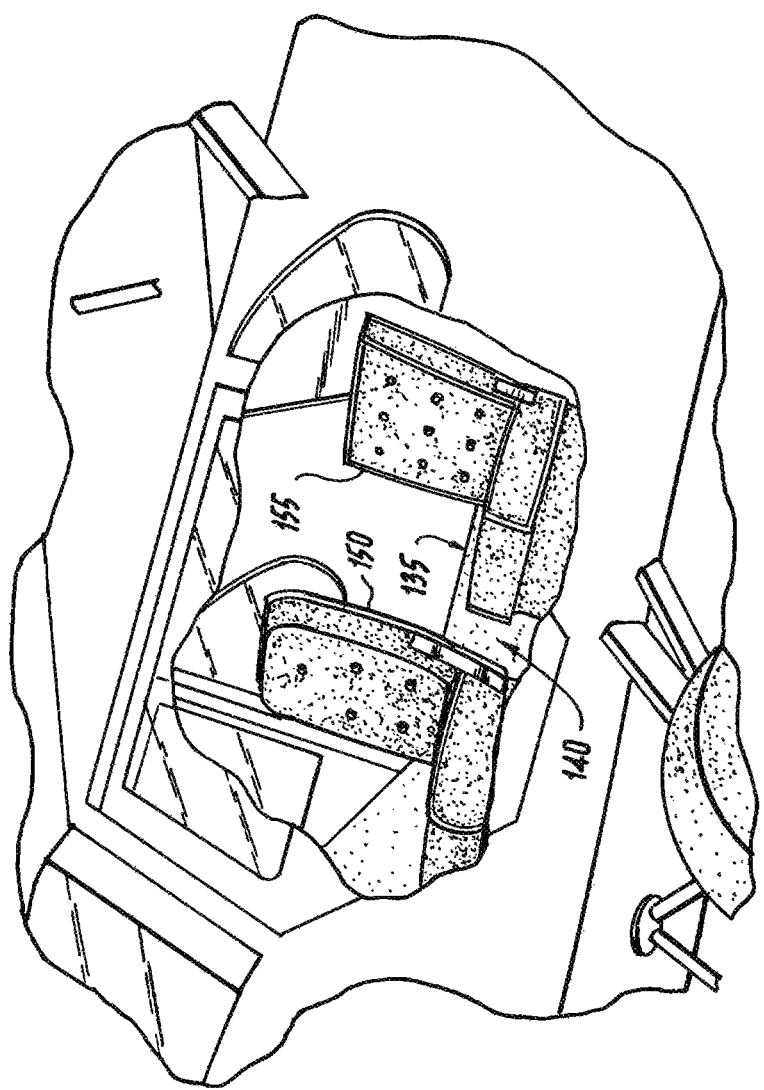
FIG. 3 shows a partially broken right perspective view of the FIG. 1 aircraft.
Figure 4:
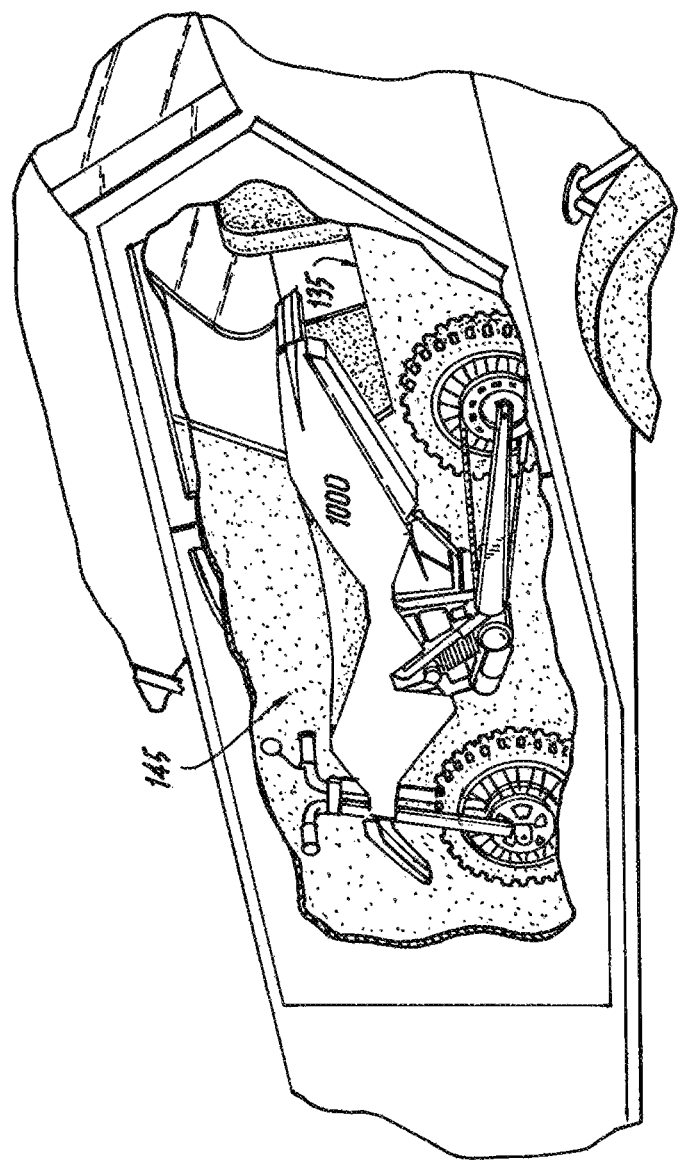
FIG. 4 shows a partially broken left perspective view of the FIG. 1 aircraft with cargo.

FIGS. 1-4 show an aircraft 100 in accordance with an illustrative embodiment of the invention. FIG. 1 shows a left perspective view; FIG. 2 shows a right perspective view; and FIG. 3 shows a partially broken right perspective view. FIG. 4 shows a partially broken left perspective view of the aircraft 100 with the addition of cargo. The aircraft 100 comprises a fuselage 105, wings 110, an engine compartment and engine 115, a propeller 120, a tail section 125, and a landing gear 130. In the present illustrative, non-limiting embodiment, the aircraft 100 appears somewhat similar to a Piper PA-18 Super Cub, previously manufactured by Piper Aircraft (Vero Beach, Fla., USA). The aircraft 100 is widened in comparison to a PA-18, as indicated by an arrow 132 in FIG. 1.

As will be further detailed below, the aircraft 100 includes a middle structure 135 that partitions the fuselage into an occupant space 140 and a cargo space 145. The cargo space 145 runs longitudinally down the aircraft 100, starting at a forward end of the fuselage 105 (i.e., at the firewall) and continuing for about two-thirds of the length of the fuselage 105. A seat for a pilot 150 and a seat for a passenger 155 are arranged in a tandem fashion in the occupant space 140. These seats 150, 155 sit lateral to a portion of the middle structure 135 and a portion of the cargo space 145. Entry and egress from these seats 150, 155 is provided by an occupant door 160. Access to the cargo space 145 is provided by a forward cargo door 165 and an aft cargo door 170.

The cargo space 145 allows the aircraft 100 to carry relatively large cargo with elongate shapes. That is, the aircraft 100, and more generally, embodiments in accordance with aspects of the invention, are well suited to carrying bicycles, motorcycles, snowmobiles, jet skis, and small boats. In FIG. 4, for example, a motorcycle 1000 is loaded into the cargo space 145 of the aircraft 100. Because the cargo is positioned close to and along the centerline of the aircraft 100, the cargo will not cause the center-of-gravity of the loaded aircraft 100 to shift significantly left/right or forward/aft. Beyond the added weight of the cargo, controllability of the aircraft 100 should therefore not be significantly modified by the presence of the cargo.

Figure 5:
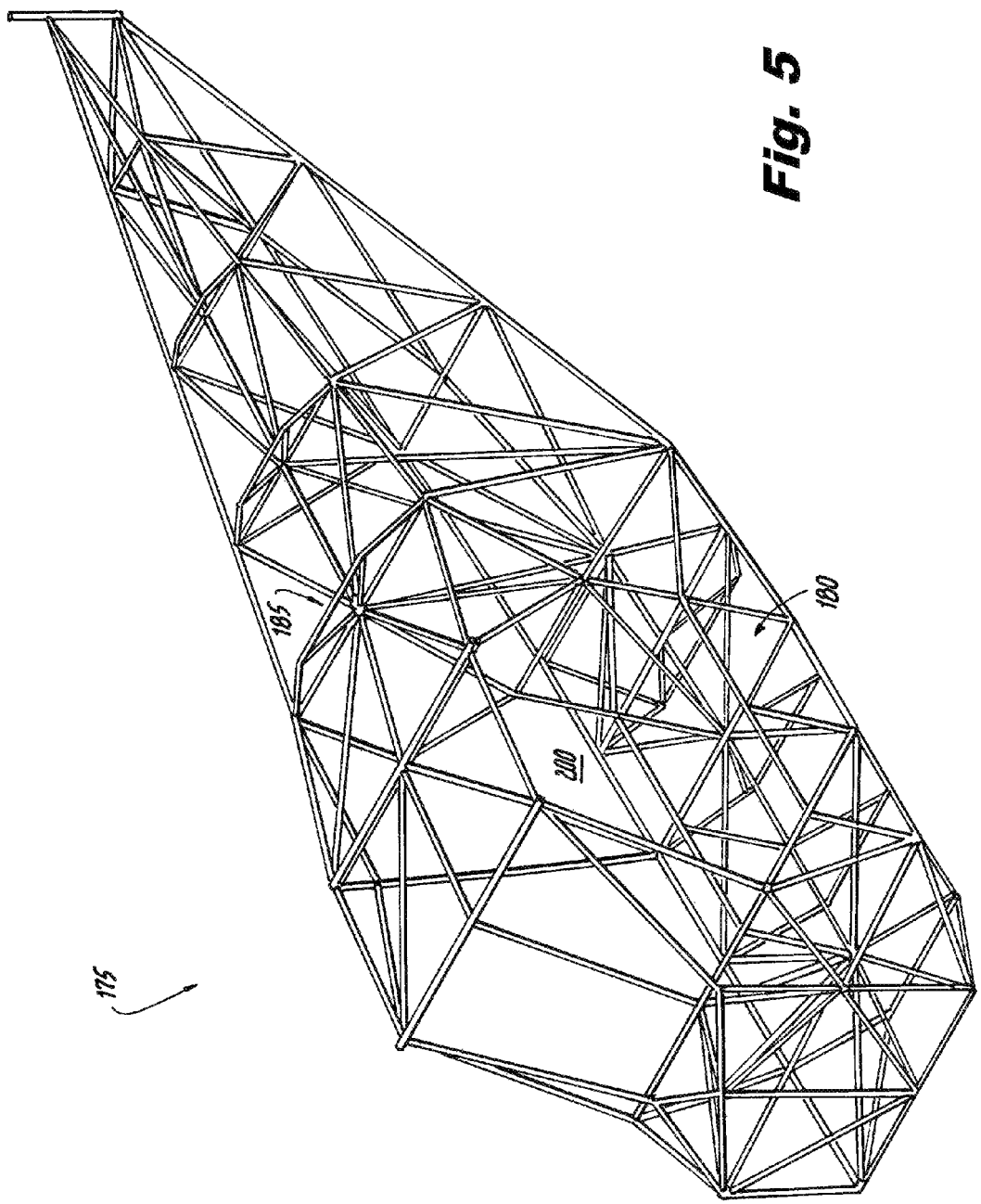
FIG. 5 shows a right perspective view of the joined tubing forming the fuselage of the FIG. 1 aircraft.
Figure 6:
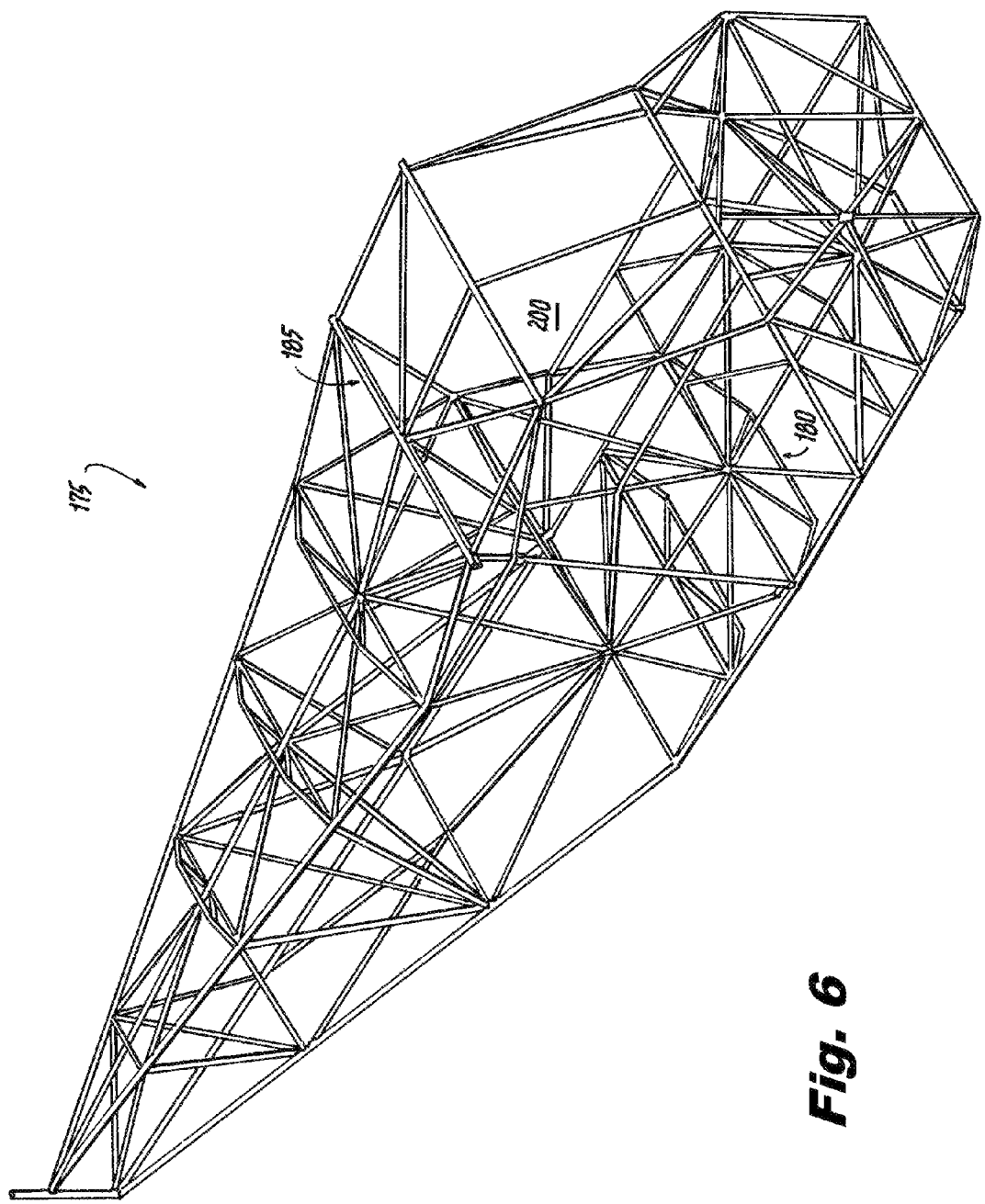
FIG. 6 shows a left perspective view of the joined tubing forming the fuselage of the FIG. 1 aircraft.

In the illustrative aircraft 100, the structure of the fuselage 105 is of a truss design, meaning that it is primarily formed of joined metallic tubes (e.g., aluminum, steel) covered in aircraft fabric (e.g., polyethylene terephthalate), although it is again emphasized that such construction is non-limiting. Joining may be variously by welding, screwing, and bolting. FIGS. 5-14 show features of this construction with the aircraft fabric and other elements removed to just reveal joined tubing 175 of the fuselage 105. For purposes of describing aspects of the invention, the fuselage structure can be conceptually separated into a floor structure 180, a roof structure 185, a first lateral side structure 190 (in the present embodiment, forming the left side of the fuselage 105), a second lateral side structure 195 (in the present embodiment, forming the right side of the fuselage 105), and the middle structure 135. FIG. 5 shows a right perspective view of the joined tubing 175 forming the fuselage 105, while FIG. 6 shows a left perspective view, FIG. 7 shows a top elevational view, and FIG. 8 shows a bottom elevational view. FIG. 9 shows a right perspective view of the joined tubing 175 forming the fuselage 105 with the first lateral side structure 190 highlighted, while FIG. 10 shows a right elevational view of the first lateral side structure 190. Similarly, FIGS. 11 and 12 show left perspective and elevational views, respectively, that highlight the joined tubing 175 of the second lateral side structure 195, while FIGS. 13 and 14 show right perspective and elevational views, respectively, of the joined tubing 175 forming the middle structure 135. The floor structure 180, the roof structure 185, the first lateral side structure 190, and the second lateral side structure 195 define a fuselage space 200 between them.

As will be seen with reference to FIGS. 13 and 14, the middle structure 135 runs down the fuselage 105 between the first lateral side structure 190 and the second lateral side structure 195. In the present embodiment, the forward approximate three quarters of the middle structure 135 runs midway between the first and second lateral side structures 190, 195, while the remaining aft quarter of the middle structure 135 angles towards the second lateral side structure 195 until it ultimately merges therewith. A forward portion of the middle structure 135 spans only part way from the floor structure 180 to the roof structure 185, while an aft portion of the middle structure 135 spans all the way from the floor structure 180 to the roof structure 185. The middle structure 135 thereby partitions the fuselage space 200 into the occupant space 140 and the cargo space 145. The occupant space 140 is disposed between the first lateral side structure 190 and the middle structure 135. The cargo space 145 is disposed between the second lateral side structure 195 and the middle structure 135.

In most aircraft, the structure of one lateral side closely replicates the structure of the other lateral side. That is not the case in the aircraft 100. Instead, in the present embodiment, some of the structural elements that would normally be found in the second lateral side structure 195 are placed into the middle structure 135. The second lateral side structure 195 is thereby made more conducive to the loading and unloading of cargo into the cargo space 145.

A comparison of the joined tubing 175 of the first lateral side structure 190, the second lateral side structure 195, and the middle structure 135 can be appreciated with reference to the elevational views in FIGS. 10, 12, and 14, respectively. Much of a truss design gets its strength from connecting tubes into triangular shapes (i.e., trusses). Comparison of FIG. 10 and FIG. 14 shows that several of the tubes forming the first lateral side structure 190 are directly replicated in the middle structure 135. In contrast, comparison of FIGS. 10, 12, and 14 demonstrates that the forward region of the second lateral side structure 195 is somewhat more sparse in construction compared to the middle structure 135 and the first lateral side structure 190. That is, fewer joined tubes 175 are utilized in the second lateral side structure 195 for the purpose of allowing cargo to be more easily loaded into the cargo space 145. In the present embodiment, the second lateral side structure 195 also includes joined tubing 175 that may be moved out of the way when loading and unloading the cargo space 145, which is further detailed below.

The middle structure 135 therefore comprises structural members, meaning that the joined tubing 175 forming the middle structure 135 provides strength and support to the aircraft 100. That is, the middle structure 135 resists at least one of tension, compression, bending, shear, and torsion acting on the aircraft 100. The middle structure 135 is not a mere non-structural partition solely intended to separate fuselage 105 spaces as would, for example, a simple partition wall. Instead, the middle structure 135 is taking on much of the role of a lateral side structure in a conventional aircraft in terms of providing strength to the aircraft 100.

Figure 16:
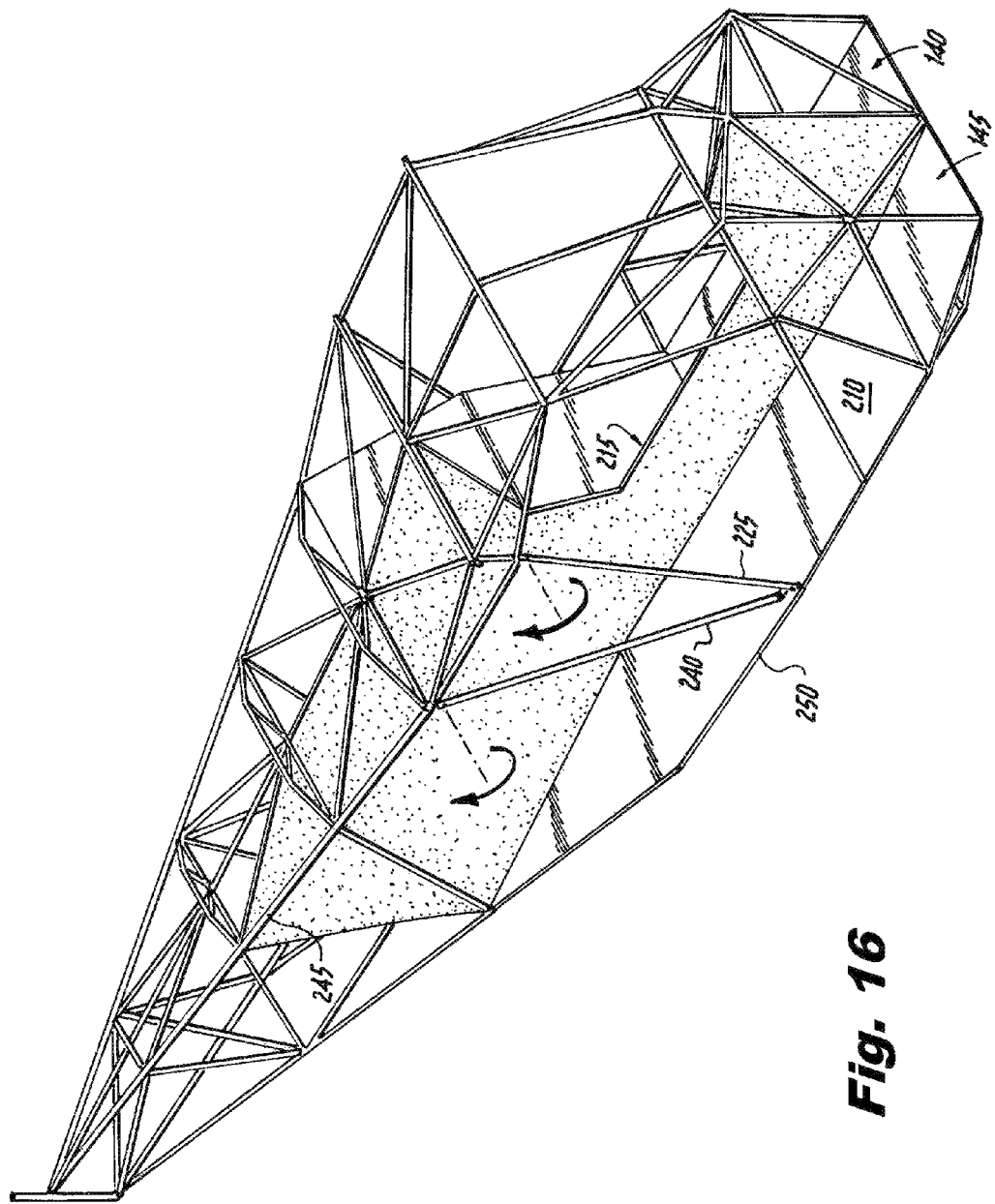
FIG. 16 shows a left perspective view of floors and coverings in the FIG. 1 aircraft.

Floor surfaces and coverings within the fuselage space 200 are shown in FIGS. 15 and 16. FIG. 15 shows a right perspective view, while FIG. 16 shows a left perspective view. The floor structure 180 defines an occupant floor surface 205 that underlies the occupant space 140 and a cargo floor surface 210 that underlies the cargo space 145. The floor surfaces 205, 210 may be formed from, for example, metal, composites (e.g., fiberglass, carbon fiber), or wood (e.g., plywood). To help accommodate cargo, the cargo floor surface 210 is substantially flat for a majority of its length and spans about two-thirds of the total length of the fuselage 105 in the longitudinal direction. The cargo floor surface 210 spans further aft in the aircraft 100 than does the occupant floor surface 205.

Middle coverings 215 cover the middle structure 135. The middle coverings 215 may be formed of a variety of materials such as aircraft fabric, metal, composites, and the like. An additional occupant space partition 217 spans between the middle structure 135 and the first lateral side structure 190 and partitions the region occupied by the pilot and passenger from the aft portion of the fuselage 105.

Various attachment hardware may be added to the cargo space 145 to help secure cargo placed therein. The cargo floor surface 210 may, for example, be fitted with tie down rings, eye bolts, hooks, or a combination thereof. Alternatively or additionally, one or more tracks (e.g., aircraft L-tracks) may be attached to the cargo floor surface 210. Likewise, the middle coverings 215 and the middle structure 135 may be fitted with their own attachment hardware such as, but not limited to, tie-down rings, eye bolts, bushings, and hooks. Suitable attachment hardware for the cargo floor surface 210, the middle coverings 215, and the middle structure 135 is available from, for example, US Cargo Control (Urbana, Iowa, USA). With this hardware in place, cargo may be easily secured in the cargo space 145 using straps, chains, and/or nets.

Figure 17:
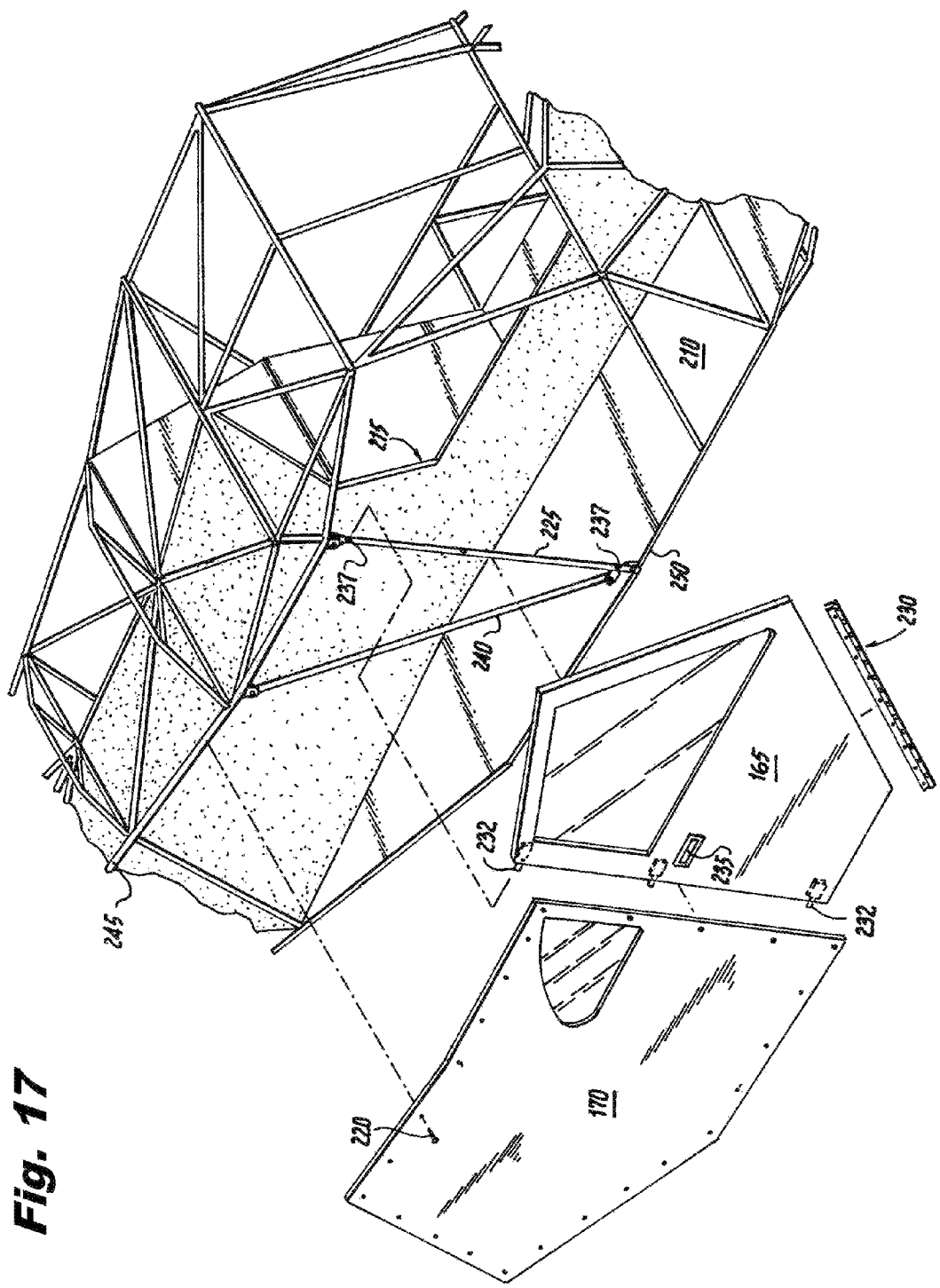
FIG. 17 shows an exploded left perspective view of the doors associated with the second lateral side structure of the FIG. 1 aircraft.

As stated above, the second lateral side structure 195 of the exemplary aircraft 100 includes a forward cargo door 165 and an aft cargo door 170 to aid in loading cargo into and out of the cargo space 145. FIG. 17 shows an exploded left perspective view of these doors 165, 170. The aft cargo door 170 spans between the floor structure 180 and the roof structure 185 and is removably mounted to the remainder of the aircraft 100 via a plurality of quarter turn fasteners 220. These quarter turn fasteners 220 engage tubing at the periphery of the aft cargo door, including a door attachment tube 225 of the second lateral side structure 195. The quarter turn fasteners 220 allow the aft cargo door 170 to be removed from the remainder of the aircraft 100 via a single hand tool, such as a screwdriver. Suitable quarter turn fasteners are available from, for example, Specialty Fasteners & Components Ltd. (Devon, England).

The forward cargo door 165 likewise spans between the floor structure 180 and the roof structure 185, but is fixated to the remainder of the aircraft 100 by a piano hinge 230. Three extendable/retractable door pins 232 are tied to a door handle 235 via respective cables and engage complementary receiving holes 237 in the door attachment tube 225 of the second lateral side structure 195. The door handle 235 and the door pins 232 thereby combine to allow the front cargo door to latch to the door attachment tube 225. By simply actuating the door handle 235, the forward cargo door 165 may be swung open on the piano hinge 230 while remaining attached to the remainder of the aircraft 100. The forward cargo door 165 may also be temporarily removed from the aircraft 100 by removing a hinge pin in the piano hinge 230.

Figure 18:
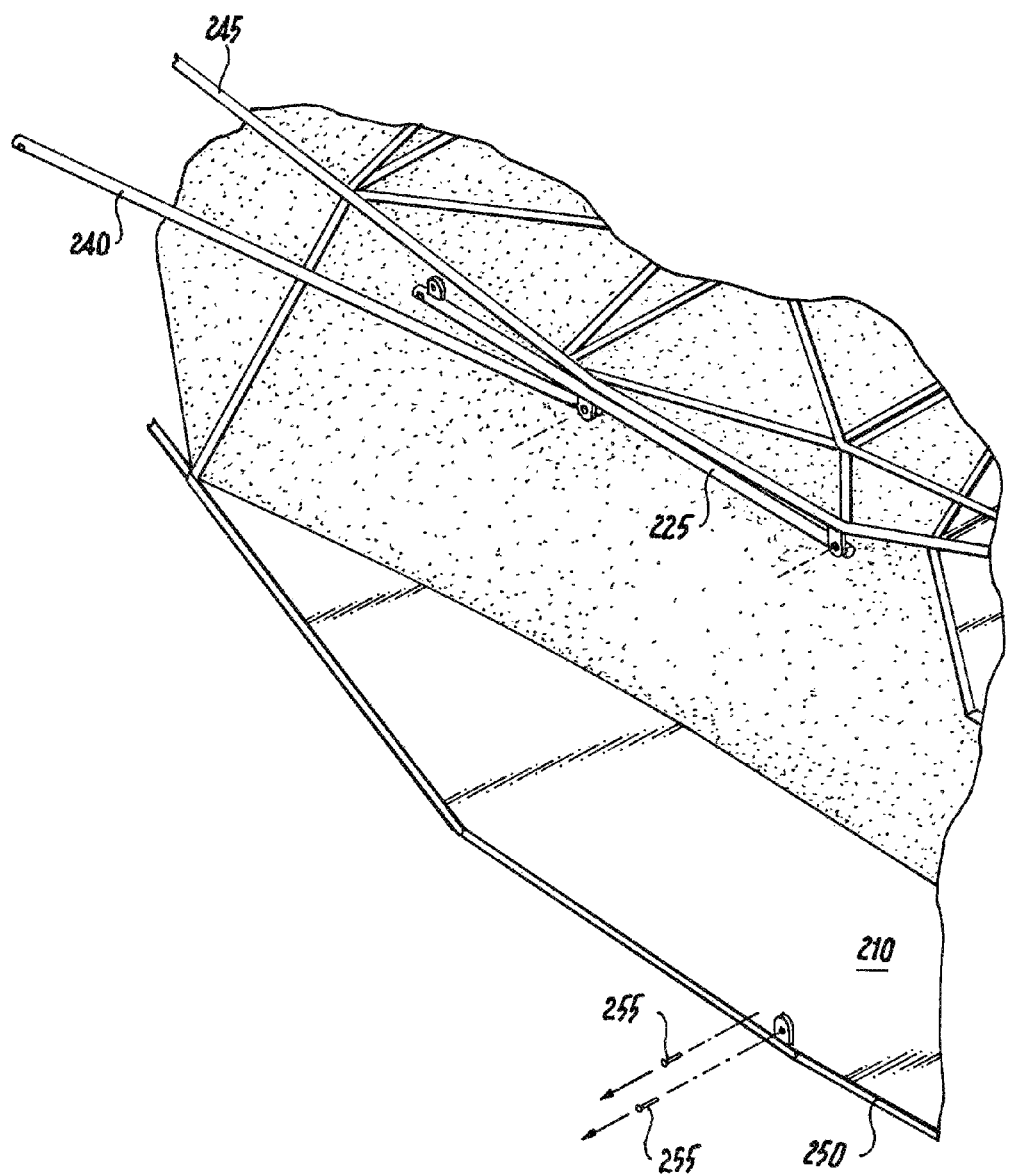
FIG. 18 shows a left perspective view of pivoting structural members in the FIG. 1 aircraft with the pivotal structural members pivoted out of the way.

To further aid in loading and unloading the aircraft 100, the door attachment tube 225 as well as an adjacent tube 240 that is disposed behind the aft cargo door 170 may be temporarily pivoted out of the way, which is illustrated in the left perspective view in FIG. 18. This is facilitated by having these tubes 225, 240 be pivotally mounted to a top longeron 245 of the of the second lateral side structure 195, while simultaneously being detachable from each other and a bottom longeron 250 by removable pins 255. That is, the door attachment tube 225 and the adjacent tube 240 are pivotal structural members. Alternatively, the door attachment tube and the adjacent tube may be pivotally mounted to the bottom longeron 250 and detachable from the top longeron 245.

So configured, relatively large cargo may be loaded into the cargo space 145 by swinging the forward cargo door 165 open (or removing it entirely) and then removing the aft cargo door 170 utilizing a screwdriver. Subsequently, the door attachment tube 225 and the adjacent tube 240 may be pivoted out of the way to provide unobstructed access to the cargo space 145. Once the cargo is loaded and secured, the pivotal tubing 225, 240 and the doors 165, 170 may be secured back in place.

Unloading the cargo may be accomplished in a similar manner.

It is preferred that the forward cargo door 165 and the aft cargo door 170 be formed of a rigid material such as a metal (e.g., aluminum) or a composite (e.g., fiber glass, carbon fiber). The attached doors 165, 170 may thereby act as structural members for the aircraft 100 and provide additional strength to the aircraft 100.

As indicated above, the cargo space 145 is well suited to carrying bicycles, motorcycles, snowmobiles, jet skis, and small boats (e.g., kayaks, canoes). At the same time, the cargo space 145 may be used for a myriad of additional purposes. It may be utilized to carry, as just a few more examples, camping gear, hunting gear (and the resultant harvested game), and building supplies (e.g., full size timbers). The cargo space 145 may also be utilized to carry drums of fuel and the like (e.g., 55 gallon drums). If fuel is carried, that fuel may even be plumbed into the aircraft's fuel system to give the aircraft 100 additional range. In order to accommodate additional passengers, the cargo space 145 may be fitted with two or three additional passenger seats. The cargo space 145 may also be fitted with one or more stretchers for the transport of injured persons in a medevac role. A nurse sitting in the passenger seat 155 in the occupant space 140 may be able to attend to the injured persons across the middle structure 135. Lastly, as just a final example, the cargo space 145 could be utilized to accommodate skydivers. The aircraft 100 may be fitted with wheel, skis, and floats, as desired.

In the aircraft 100, cargo is kept inside the fuselage 105 rather than being strapped to the outside of the aircraft 100 or carried in external pods, which may produce large amounts of drag. Strapping cargo to the outside of an aircraft, while practiced in places such as Alaska, is considered dangerous and may be illegal.

Advantageously, the aircraft 100 may be formed in part utilizing components from already existing aircraft 100 or, stated in the reverse, the fuselage 105 of the present aircraft 100 may be retrofitted into an already existing aircraft to provide that already existing aircraft with the advantages of greater cargo carrying utility. For the present illustrative aircraft 100, for example, wings, tails, landing gears, and engines may, for example, be sourced from existing Piper PA-18 Super Cub aircraft or similar, presently-manufactured, Cub-like designs from, for example, CubCrafters (Yakima, Wash., USA) or American Legend Aircraft Co. (Sulphur Springs, Tex., USA). In some cases, larger engines may be desirable to aid in accommodating the extra weight of the cargo. These larger engines may be sourced from Lycoming Engines (Williamsport, Pa., USA) or Continental Motors, Inc. (Mobile, Ala., USA).

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

Figure 19:
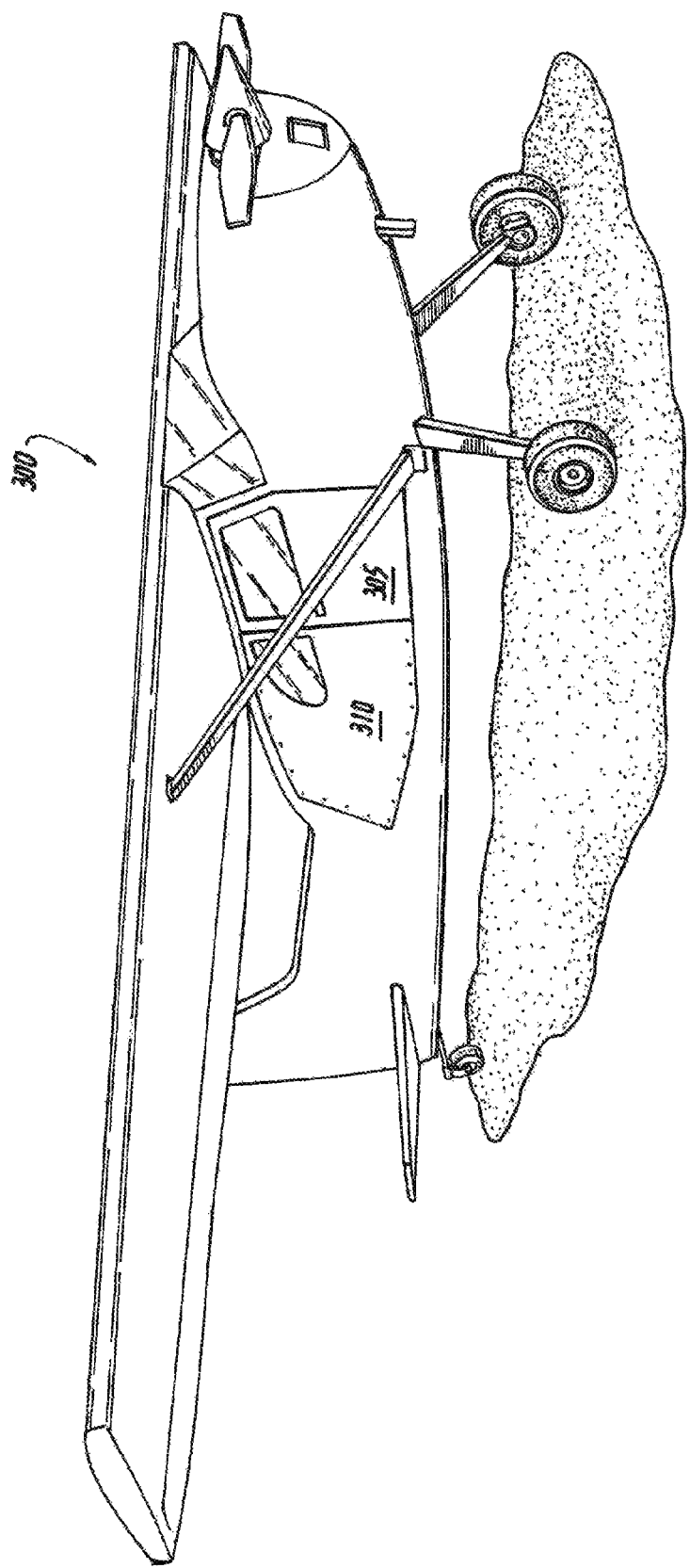
FIG. 19 shows a left perspective view of an aircraft in accordance with a second illustrative embodiment of the invention.

For example, while the illustrative aircraft 100 detailed above was of a truss design, aspects of the invention may be applied to aircraft with different types of structures (e.g., geodesic, monocoque, semi-monocoque, composite). FIG. 19 shows a left perspective view of a modified light, single-engine aircraft 300 with a semi-monocoque design that utilizes riveted aluminum, in accordance with a second illustrative embodiment of the invention. The modified aircraft 300 is similar to a Cessna 185 manufactured by Cessna Aircraft Co. (Wichita, Kans., USA). The modified aircraft 300 includes a cargo space well suited for carrying relatively large, elongate cargo, as well as a forward cargo door 305 and an aft cargo door 310 suitable for loading such cargo.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. §112(f). In particular, the use of "step of" in the claims herein is not intended to invoke the provisions of AIA 35 U.S.C. §112(f).

What is claimed is:

1. An aircraft with a fuselage, the fuselage comprising:
   a floor structure;
   a roof structure;
   a first lateral side structure;
   a second lateral side structure, the floor structure, the roof structure, the first lateral side structure, and the second lateral side structure defining a fuselage space between them;
   a middle structure running between the first lateral side structure and the second lateral side structure such that the middle structure partitions the fuselage space into an occupant compartment and a cargo compartment, the occupant compartment disposed between the first lateral side structure and the middle structure, and the cargo compartment disposed between the second lateral side structure and the middle structure; and
   a seat for a pilot disposed in the occupant compartment lateral to a portion of the middle structure and a portion of the cargo compartment;
   wherein a first portion of the middle structure spans all the way between the floor structure and the roof structure, and a second portion of the middle structure spans only part way between the floor structure and the roof structure.

2. The aircraft of claim 1, wherein the middle structure merges with the first lateral side structure or the second lateral side structure.

3. The aircraft of claim 1, wherein the middle structure comprises structural members.

4. The aircraft of claim 1, wherein the fuselage is of a truss design.

5. The aircraft of claim 4, wherein the middle structure comprises joined tubing.

6. The aircraft of claim 1, wherein:
   the first lateral side structure comprises a plurality of first structural members;
   the middle structure comprises a plurality of middle structural members; and
   at least some of the plurality of first structural members are replicated in the plurality of middle structural members.

7. The aircraft of claim 1, wherein the second lateral side structure comprises a cargo door assembly.

8. The aircraft of claim 7, wherein the cargo door assembly spans between the floor structure and the roof structure.

9. The aircraft of claim 7, wherein the cargo door assembly is removably mounted to a remainder of the aircraft.

10. The aircraft of claim 7, wherein the cargo door assembly is removably mounted at least in part via a plurality of quarter turn fasteners.

11. The aircraft of claim 7, wherein the cargo door assembly is removable from a remainder of the aircraft with only a single hand tool.

12. The aircraft of claim 7, wherein:
the second lateral side structure comprises a pivotal structural member pivotally mounted to a different structural member of the second lateral side structure; and
the cargo door assembly is removably mounted to the pivotal structural member.

13. The aircraft of claim 12, wherein the second lateral side structure comprises a hinged door assembly, the hinged door assembly removably attached to the aircraft.

14. The aircraft of claim 13, wherein the hinged door assembly latches to the pivotal structural member.

15. The aircraft of claim 1, further comprising seating for a passenger disposed in the occupant compartment aft of the seat for a pilot and lateral to a portion of the middle structure and a portion of the cargo compartment.

16. The aircraft of claim 1, wherein the floor structure defines a cargo floor surface underlying the cargo compartment and spanning at least one-half of the fuselage in a longitudinal direction.

17. The aircraft of claim 16, wherein the cargo floor surface is substantially flat for a majority of a length of the cargo floor surface in the longitudinal direction.

18. The aircraft of claim 16, wherein:
the floor structure defines an occupant floor surface underlying the occupant compartment; and
the cargo floor surface spans further aft in the aircraft than the occupant floor surface.

19. The aircraft of claim 1, wherein the seat for a pilot is disposed in the occupant compartment lateral to part of the second portion of the middle structure.

* * * * *